US008454071B2

(12) United States Patent
Stoia (10) Patent No.: US 8,454,071 B2
(45) Date of Patent: Jun. 4, 2013

(54) INSTALLATION AND RETENTION OF SLIDING ARMREST COMPONENTS

(75) Inventor: Jonathon Stoia, White Lake, MI (US)

(73) Assignee: Faurecia Interior Systems, Inc., Auburn Hills, MI (US)

(*) Notice: Subject to any disclaimer, the term of this patent is extended or adjusted under 35 U.S.C. 154(b) by 17 days.

(21) Appl. No.: 13/231,513

(22) Filed: Sep. 13, 2011

(65) Prior Publication Data

US 2013/0062899 A1 Mar. 14, 2013

(51) Int. Cl.
*B60N 2/46* (2006.01)

(52) U.S. Cl.
USPC ........................................ 296/24.34; 296/1.09

(58) Field of Classification Search
USPC .. 296/24.34, 37.8, 1.09; 312/334.44; 248/429, 248/430
See application file for complete search history.

(56) References Cited

U.S. PATENT DOCUMENTS 6,419,314 B1 * 7/2002 Scheerhorn .............. 297/188.19
2011/0240821 A1 * 10/2011 Couasnon et al. ............ 248/429

* cited by examiner

*Primary Examiner* — Dennis Pedder
*Assistant Examiner* — Beverly Becker
(74) *Attorney, Agent, or Firm* — Reising Ethington P.C.

(57) ABSTRACT

A slide mechanism for use with a vehicle armrest includes a sliding plate and a stationary plate in sliding engagement with each other via a coupling that includes an elongated guide and a guide follower. The elongated guide defines a slide direction for the slide mechanism and is retained to one of the plates by guide retention features located at each end of the guide. Each retention feature is constructed to restrict movement of the elongated guide in all directions transverse to the slide direction. A spacer is disposed at one end of the elongated guide to hold the guide in place in the slide direction so that retention is maintained. The spacer can be interposed between a retention feature stop and an end of the elongated guide and/or can extend from a cover attached to the plate that includes the retention features.

20 Claims, 4 Drawing Sheets

INSTALLATION AND RETENTION OF SLIDING ARMREST COMPONENTS

TECHNICAL FIELD

The present disclosure relates generally to the installation and retention of vehicle console components having sliding features.

BACKGROUND

Vehicle consoles are typically multi-functional assemblies and are often located between the driver and passenger sides of a vehicle interior. Such consoles may include one or more storage areas, cup holders, accommodations for shift or brake levers, power outlets, coin holders, lighting, ashtrays, armrests, hinged or sliding doors, etc. Consoles may be arranged between separate bucket-style seats, in front of bench-style seats, or may fold out of or away from a seat back or some other vehicle component. Some consoles extend from a location forward of the front seats of a vehicle to a location rearward of the front seats of the vehicle so that occupants in all areas of the vehicle can access and use its features. Certain components of a console assembly may be adjustable or movable for more convenient use by different vehicle occupants.

For example, co-assigned U.S. Patent Application Publication No. 2010/0072767 by D'Alessandro describes a vehicle interior assembly that includes a center console and a sliding portion operable to slide in frontward and rearward directions substantially parallel to a longitudinal axis of the console to cover and uncover at least one storage bin. The sliding portion may be C-shaped with a portion over a terminal end of the console and a portion under the terminal end of the console. When the sliding portion is moved rearward, at least one storage bin may be uncovered by the portion over the terminal end and/or the portion under the terminal end may reveal a tray convenient for use by passengers seated behind the front seats of the vehicle.

SUMMARY

In accordance with one embodiment, a slide mechanism for use with a vehicle armrest is provided that includes a guide retention plate having guide retention features and a guide follower plate having a guide follower. The plates are in an overlapping arrangement with each other. The slide mechanism also includes an elongated guide that is in sliding engagement with the guide follower. The elongated guide has opposite ends aligned along a slide direction, and each one of the opposite ends is retained by a different guide retention feature such that movement of the elongated guide in all directions transverse to the slide direction is restricted by the guide retention features. One of the guide retention features includes a stop located at one end of the elongated guide. The slide mechanism further includes a spacer located at the opposite end of the elongated guide so that the elongated guide lies between the stop and the spacer. The spacer limits the amount of movement of the elongated guide in the slide direction and away from the stop so that retention of the one end of the elongated guide is maintained by its corresponding guide retention feature.

According to another embodiment, the guide retention feature that retains the opposite end of the elongated guide further comprises a corresponding stop, and the spacer is located between the corresponding stop and the opposite end of the elongated guide.

According to another embodiment, the spacer is a separate piece in contact with at least one of the opposite end of the elongated guide or the corresponding stop.

According to another embodiment, the spacer is a separate piece in contact with at least one of the opposite end of the elongated guide or the corresponding stop and one end of the spacer extends into an opening formed at the opposite end of the elongated guide.

According to another embodiment, the slide mechanism also includes a cover attached to the guide retention plate, and the spacer extends from the cover.

According to another embodiment, the guide retention plate is a sliding plate and the guide follower plate is a stationary plate so that the elongated guide moves with the sliding plate when the plates move relative to each other in the slide direction.

According to another embodiment, the guide retention plate is a stationary plate and the guide follower plate is a sliding plate so that the guide follower moves with the sliding plate when the plates move relative to each other in the slide direction.

According to another embodiment, each of the retention features further comprises a retention wall, each retention wall includes an opening that substantially surrounds the elongated guide to restrict movement of the elongated guide in all directions transverse to the slide direction.

According to another embodiment, the slide mechanism further comprises a pair of elongated guides arranged parallel with the slide direction and in sliding engagement with a corresponding pair of guide followers of the guide follower plate. Each of the elongated guides has opposite ends and each end is retained by a different one of the guide retention features such that movement of the elongated guides in all directions transverse to the slide direction is restricted by the guide retention features. Each of the guide retention features includes a stop located so that each elongated guide lies between a corresponding pair of stops. The slide mechanism further comprises a spacer interposed between one of the ends of each elongated guide and the corresponding retention feature stop so that movement of each of the elongated guides in the slide direction is restricted to maintain the retention of both ends of each elongated guide by the respective guide retention features.

According to another embodiment, a vehicle console assembly is provided that comprises a console base and an armrest attached to the console base. The armrest comprises the slide mechanism and a decorative covering disposed over the slide mechanism.

In accordance with another embodiment, a method of making a slide mechanism for use with a vehicle armrest is provided. The method includes the steps of: (a) engaging one end of an elongated guide with a guide retention feature of a guide retention plate, the elongated guide being in sliding engagement with a guide follower of a guide follower plate; (b) engaging an opposite end of the elongated guide with another guide retention feature of the guide retention plate; and (c) interposing a spacer between the one end of the guide and a stop of the guide retention feature of step (a) to ensure retention of both ends of the elongated guide by the guide retention features.

According to another embodiment, step (c) comprises the steps of: providing a cover having a projection extending from the cover; and attaching the cover to the guide retention plate so that the projection is the interposed spacer.

According to another embodiment, step (c) comprises the steps of: inserting one end of the spacer into an opening at the one end of the elongated guide; and placing an opposite end of the spacer in contact with said stop.

According to another embodiment, the method further comprises the steps of: (i) passing said one end of the elongated guide through a retention opening formed in the guide retention feature of step (a); and (ii) subsequently passing said opposite end of the elongated guide through a retention opening formed in the guide retention feature of step (b) while simultaneously increasing the amount of space between said stop and said one end of the elongated guide.

According to another embodiment, the elongated guide is at an inclined angle during step (i) relative to the angle of the elongated guide during step (ii).

Within the scope of this application it is envisaged that the various aspects, embodiments, examples, features and alternatives set out in the preceding paragraphs, in the claims and/or in the following description and drawings may be taken independently or in any combination thereof. For example, features disclosed in connection with one embodiment are applicable to all embodiments, except where there is incompatibility of features.

DESCRIPTION OF THE DRAWINGS

One or more embodiments will hereinafter be described in conjunction with the appended drawings, wherein like designations denote like elements, and wherein.

DETAILED DESCRIPTION OF THE PREFERRED EMBODIMENT(S)

As will be apparent from the following disclosure, overlapping plates of a slide mechanism for use with a vehicle armrest may be in sliding engagement with each other via a coupling that includes an elongated guide, such as a tubular rod, and a guide follower. Opposite ends of the elongated guide may be retained by guide retention features at each end. Each of the retention features may engage an end of the elongated guide in a manner that restricts the movement of the guide in directions transverse to a slide direction of the mechanism. At least one of the retention features may also include a stop located at an end of the elongated guide. A spacer may be arranged at the other end of the elongated guide to take up or account for the additional space at that other end, where the additional space may be used to aid in the assembly of the slide mechanism. Various embodiments including one or more of these features can provide a slide mechanism in which the guide is securely retained as a part of the mechanism with a very low likelihood of the guide separating from its retention features.

While the embodiments described below are shown as part of a vehicle armrest for attachment to a center console where the sliding direction is forward and rearward with respect to the vehicle, it should be appreciated that the disclosed slide mechanism may be used with other types of armrests, such as seat armrests or door armrests, along with other vehicle components where a sliding feature may be useful. Additionally, the slide direction may be in any direction, such as side-to-side, upward and downward, or some other direction. It is also noted that the appended drawings are not necessarily to scale and that any cross-hatching shown is provided for clarity in distinguishing among different components and is not meant to limit the types of materials that may be used for each component.

Figure 1:
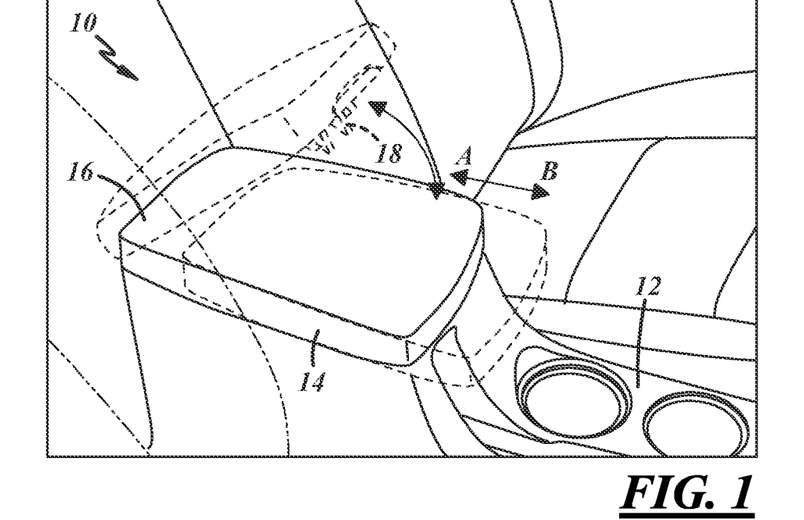
FIG. 1 is a perspective view of a portion of a vehicle interior, showing a vehicle console assembly having a sliding armrest, according to one embodiment.

Referring now to FIG. 1, a vehicle console assembly 10 is shown. The illustrated console 10 is a center console located between separate front seats of a vehicle and includes a console base 12 and a sliding armrest 14. Console base 12 is securely attached to the vehicle body and may include any of the various features mentioned earlier, such as cup holders, etc., formed in the base or in some other component attached to the base 12. For example, the particular embodiment of FIG. 1 includes a storage area located beneath the armrest 14, and the armrest 14 is pivotally attached to the base in a manner that allows the armrest to double as a lid or door that opens in the direction of the curved arrow to provide access to the storage area. The pivoting feature is optional, as the slide mechanism described below does not require the armrest 14 to be so attached to the console base 12 in order to function.

Armrest 14 is attached to the console base 12 so that it is at the top of the console 10 and may be in a convenient location for a driver or passenger to use to support an arm. Armrest 14 is a sliding armrest, meaning that at least a portion of the armrest slides in one or more slide directions to change the overall location of the top of the armrest. For instance, an armrest portion may slide to move to a more convenient arm-supporting location, to move to an out-of-the-way location, to reveal some other portion of the console concealed therebeneath, or for some other reason. In the illustrated embodiment, a top portion of armrest 14 is arranged to slide in a slide direction shown by the double-arrowed line that is forward and rearward with respect to the vehicle. In FIG. 1, armrest 14 is shown in a rearward position A and is also shown in a forward position B in dashed lines. Other or additional slide directions are possible.

In this embodiment, armrest 14 includes a covering 16 and latching components 18 attached to a slide mechanism, which is not visible beneath the covering 16 in FIG. 1. Covering 16 is disposed over the slide mechanism and may include various components, such as an outer layer of decorative material (e.g., leather, synthetic film or fabric, or other material) having a desired appearance and tactile feel. The covering 16 can include an optional layer of foam or other cushion-like material between the outer layer of decorative material and the slide mechanism for comfort and feel, and can also include one or more other components such as a structural frame, plate, fasteners, and/or attachment tabs or features. Covering 16 is optional, as it may be possible to construct the slide mechanism to be sufficiently decorative, or the covering 16 may be integrated as a part of the slide mechanism. Latching components 18 are also optional and are shown here as components that are attached to the slide mechanism and configured to help this particular pivotally mounted armrest 14 stay in a closed position. Components 18 could be attached to the console base 12 or omitted entirely, and several different types of latching components are known in the art.

Figure 2:
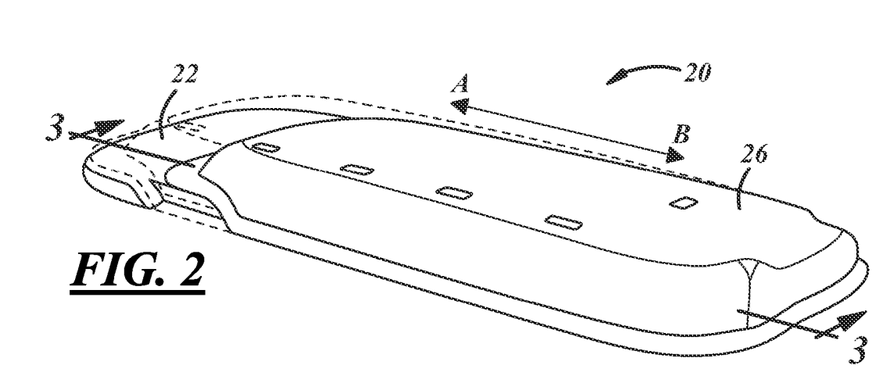
FIG. 2 is a perspective view of one embodiment of a slide mechanism that may be used with the console assembly of FIG. 1, showing the mechanism in extended and retracted positions.

FIG. 2 shows one embodiment of a slide mechanism 20 that may be used with the armrest 14 of console 10 shown in FIG. 1 or with various other armrests and/or consoles. In particular, FIG. 2 shows the slide mechanism 20 of armrest 14 of FIG. 1 with the covering 16 and latching components 18 removed. FIG. 2 shows the slide mechanism 20 in the forward position B and in the rearward position B in hidden lines. Position A may also be referred to as a retracted position and position B may be referred to as an extended position, as the slide mechanism 20 could be mounted so that the top portion of the armrest extends toward the rear of the vehicle or in any other direction.

Figure 3:
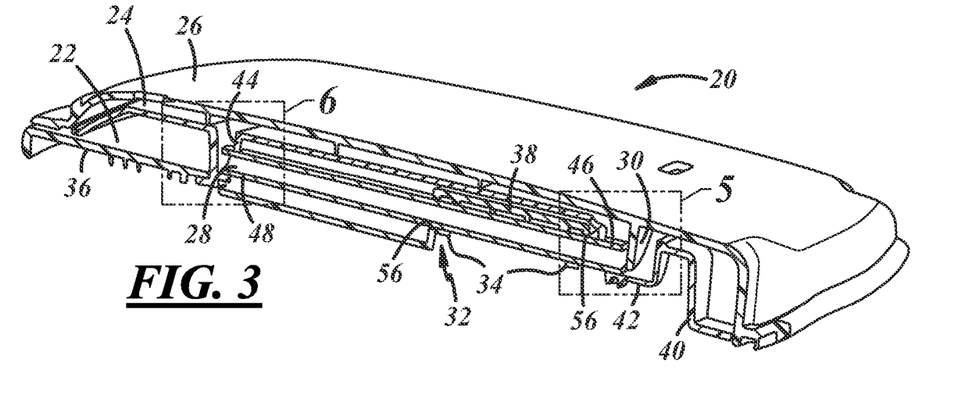
FIG. 3 is a cut-away view of the slide mechanism of FIG. 2, showing a stationary plate, a sliding plate, an elongated guide, and a spacer in the form of a projection, according to one embodiment.

Referring to FIG. 3, this slide mechanism 20 is shown in the retracted position and includes stationary plate 22, sliding plate 24, cover 26, elongated guide 28, and spacer 30. The two plates 22, 24 are arranged so that they at least partially overlap and are in sliding engagement with each other via a coupling 32 that is formed by the elongated guide 28 and one or more components of one of the plates, which in this case is stationary plate 22. Coupling 32 may also include optional bushings 34 as shown. Bushings 34 may be used to help determine the amount of friction present at the coupling 32 as the elongated guide 28 and the stationary plate 22 of the illustrated embodiment move relative to one another. For example, bushings 34 may be constructed to have a higher or lower friction fit with the guide 28 to provide a slide mechanism that requires more or less effort to operate, respectively. In one embodiment, bushings 34 are constructed from a polymer foam material, but may be constructed from any suitable material that provides the desired amount of friction with guide 28.

Stationary plate 22 is the portion of the slide mechanism 20 that does not move in this particular embodiment. For example, when used as part of armrest 14 of FIG. 1, stationary plate 22 is attached to the console base 12. In this embodiment, stationary plate 22 includes base portion 36 and guide follower 38. As arranged in FIG. 3, stationary plate 22 may thus also be referred to as a guide follower plate 22. Sliding plate 24 is the portion of the slide mechanism 20 that moves in this particular embodiment. For example, when used as part of armrest 14 of FIG. 1, sliding plate 24 moves with the top of the armrest relative to the console base 12 while plate 22 remains stationary. In this embodiment, sliding plate 24 includes base portion 40 and guide retention features 42 and 44 located at opposite ends 46, 48 of guide 28. As arranged in FIG. 3, sliding plate 24 may thus also be referred to as a guide retention plate 24. In the arrangement of FIG. 3, the elongated guide 28 is retained by retention features 42, 44 and moves together with the sliding plate 24 as it moves in the slide direction, while guide follower 38 remains in place with stationary plate 22. In another embodiment, retention features 42, 44 are part of the stationary plate 22 and guide follower 38 is part of the sliding plate 24 so that the elongated guide 28 remains stationary and the guide follower 38 moves with the sliding plate 24. In yet another embodiment, the stationary plate 22 may be arranged above or over sliding plate 24 so that a bottom portion of the armrest moves from a retracted to an extended position relative to a fixed top portion. When referring to the embodiments shown in the figures, plates 22 and 24 will be referred to as stationary and sliding plates respectively, but it should be understood that whichever of the plates is stationary or sliding is not important to the guide retention features described herein or how such features interact with the elongated guide, as the retention features may be included with either of the plates 22, 24.

Figure 4:
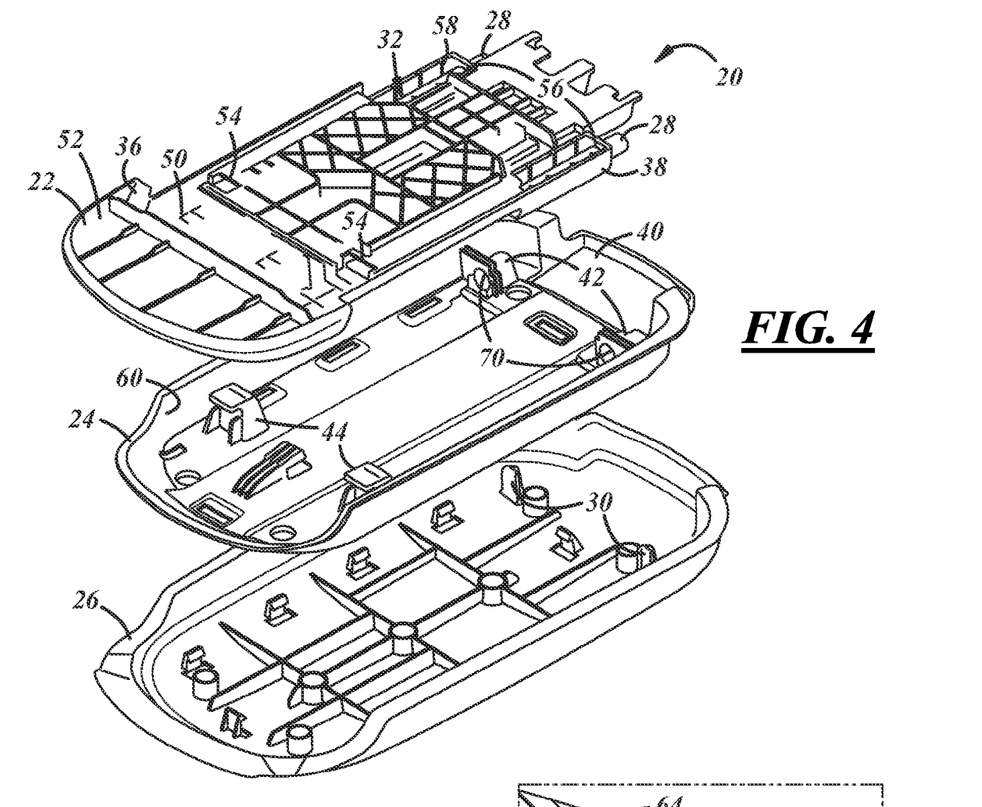
FIG. 4 is a partially exploded view of the slide mechanism of FIG. 2, shown upside-down with respect to FIG. 2.

Referring now to FIG. 4, a partially exploded view of the slide mechanism 20 of FIGS. 2 and 3 is shown oriented upside-down relative to FIGS. 2 and 3. This embodiment includes a pair of elongated guides 28. Accordingly, stationary plate 22 includes an associated pair of guide followers 38, and sliding plate 24 includes associated pairs of guide retention features 42, 44. The bushings 34 of FIG. 3 have been omitted in FIG. 4. As already described, stationary plate 22 of this embodiment includes base portion 36 and guide followers 38. Base portion 36 is generally plate-like, being relatively flat overall, but can be formed in any shape and from any material. In one embodiment, base portion 36 is constructed from a plastic material such as polypropylene, ABS, nylon, or other suitable material and may include a network of stiffening ribs as shown. The base portion 36 may include other optional features as shown, such as attachment portion 50, concealing feature 52, limiting slots 54, or other features. Attachment portion 50 may accommodate fasteners for attachment of the slide mechanism to the console base of FIG. 1, for example. Concealing feature 52 may be positioned so that it covers a part of a console storage area opening or some other underlying feature when the slide mechanism is in the extended position. Limiting slots 54 may be included to interact with a component of the sliding plate 24 (e.g., portions of the retention features 44 in this example) to stop forward movement of the sliding plate at the extended position. Base portion 36 may include several other features not described here.

Each guide follower 38 is fixed to or is integrally formed with the stationary (or guide follower) plate 22 and is a component that has features that slidingly engage elongated guides 28 so that plate 22 moves in the same direction as the end-to-end direction of guides 28 when the plates 22 and 24 are moved relative to one another. In this instance, the engaging features of guide follower 38 are openings 56 (also shown in FIG. 3) arranged at opposite ends of the guide followers 38, which may be complimentary in shape with the outer surface of the elongated guides 28. In this particular embodiment, the openings 56 may be generally round or circular to accommodate and compliment the round cross-section of the guides 28, though the openings 56 may have shapes different from the cross-sectional shape of the guides 28. For example, in embodiments that include the earlier-described bushings, the openings 56 need only be large enough to allow the guides 28 to pass through and sufficiently small to guide plate 22 along the guides 28 while the bushings provide the desired amount of friction to the coupling 32. Where bushings are included, the guide followers 38 may include bushing retention features such as ribs 58 or other features that hold the bushings in place with plate 22, whether it is the stationary plate as shown or the sliding plate in other embodiments. Openings 56 need not completely surround the guide 28, and features other than openings may be used to engage the guide. Guide followers 38 may be integral with plate 22 as shown, or may each include one or more separately attached pieces. In this embodiment, guide followers 38 extend from the base portion 36 toward the sliding plate 24 so that they are located between the plates 22, 24 when the plates are assembled with each other.

As already described, sliding plate 24 of the illustrated embodiment includes base portion 40 and guide retention features 42, 44. Base portion 40 is generally plate-like, being relatively flat overall, but can be formed in any shape and from any material such as a similar plastic material or other suitable material as described above in reference to the stationary plate 22. In this embodiment, base portion 40 includes sidewalls 60 that generally circumscribe the remainder of the base portion 40 and conceal the guide 28, coupling 32, retention features 42, 44 and other features located between the plates 22, 24 when they are assembled with each other. The base portion 40 may also include various tabs, slots, openings, apertures or other features as shown for attachment of cover 26, for example, or for any other purpose.

Each guide retention feature 42, 44 is fixed to or is integrally formed with the sliding (or guide retention) plate 24. Each retention feature 42, 44 engages and retains an end of the elongated guide 28 in a manner that restricts the movement of the guide 28 with respect to the plate 24 in directions transverse to the slide direction. In other words, when retained by the retention features 42, 44, guide 28 cannot be pulled away from or snapped out of the sliding plate 24. Retention features 42 and 44 may be integral with plate 24 as shown, or may each include one or more separately attached pieces. In this embodiment, retention features 42, 44 extend from the base portion 40 toward the stationary plate 22 so that they are located between the plates 22, 24 when the plates are assembled with each other. Retention features 42, 44 will be described in greater detail below with reference to additional figures following a brief description of other slide mechanism components.

Cover 26 may be attached to sliding plate 24 in this embodiment. It may provide the overall slide mechanism with additional height or thickness and/or provide additional structure to the slide mechanism. In the embodiment of FIG. 4, cover 26 includes various tabs and slots for attachment to the sliding plate 24 and/or covering 16 of FIG. 1, along with bosses, stiffening ribs and sidewalls. Cover 26 may also be constructed from any material such as the plastic or other materials that may be used to construct the plates 22, 24. In this particular embodiment, a pair of spacers 30 is integrated with cover 26 in the form of tabs or ribs that extend from a surface of the cover that faces the sliding plate 24. Spacers 30 extend toward sliding plate 24 and are located along the cover to be generally aligned with the retention features 42 in this embodiment to help locate the ends of each of the elongated guides 28 at their respective retention features 42, 44, as will be described in more detail below. The illustrated cover 26 is sized and shaped to cover substantially all of the sliding plate 24, but may be configured to cover only a portion of the sliding plate 24. For example, cover 26 may be configured primarily to provide spacers 30 and could be sized and shaped as a smaller piece that covers only an area of the plate 24 associated with the retention features 42.

Elongated guides 28 are components that may generally define the slide direction of the slide mechanism. As best shown in FIG. 3, each elongated guide 28 includes opposite ends 46, 48 arranged along the slide direction. In this embodiment, the slide direction is linear in the direction between ends 46, 48, but the guides could be curved between ends 46 and 48 to define a variable slide direction or a curved slide path. The guides 28 may have a constant cross-section. The guide cross-section may be in any shape, such as the circular or annular shape shown in the figures, or any other shape. The guides may be in the form of hollow tubes, as shown, or in the form of solid rods. In other embodiments, the guides may be in the form of a track having any cross-section that can engage a guide follower having complimentary features. Guides 28 may be constructed from any suitable material, including metals or plastics. In one embodiment, the guides 28 are constructed from a lightweight metal such as an aluminum alloy and are tubular in form.

Figures 5, 6:
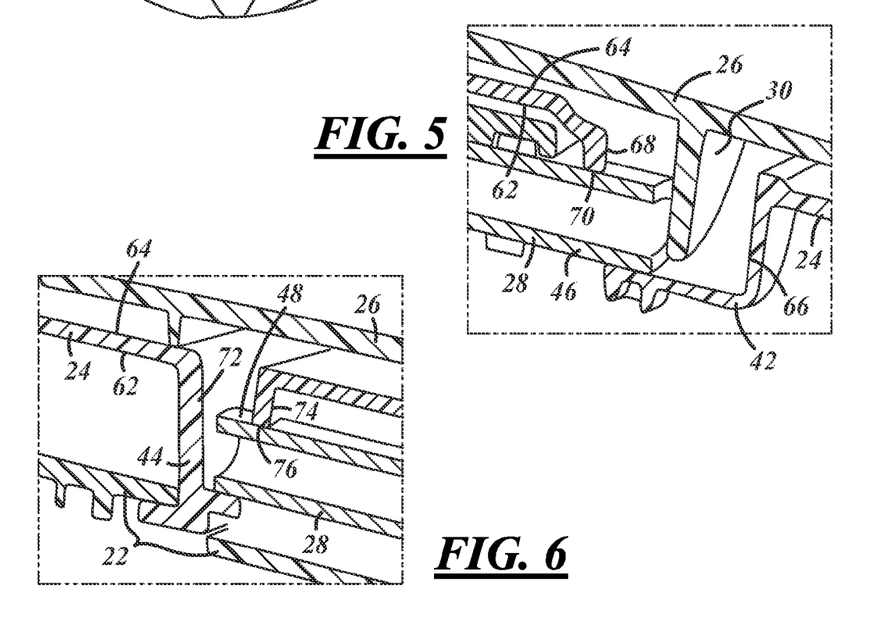
FIG. 5 is an enlarged view of a guide retention feature of FIG. 3.
FIG. 6 is an enlarged view of another guide retention feature of FIG. 3.

Referring now to FIG. 5, an enlarged view of one of the guide retention features 42 from FIGS. 3 and 4 is shown at one end 46 of the elongated guide 28. In this embodiment, in which retention feature 42 is formed integrally with plate 24 (e.g., by plastic injection molding), the feature 42 may be in the form of a depression or recess formed in the plate 24 (or as a standing feature when viewed as oriented as in FIG. 4). In other words, the retention feature 42 may be formed so that it is located on one side 62 of the plate 24 with access to the retention feature from an opposite side 64 of the plate 24. Retention feature 42 may include a stop 66, a retention wall 68, and a retention opening 70 formed in the wall 68. Stop 66 and wall 68 are spaced apart from each other in the slide direction. Opening 70 performs the earlier-described function of restricting movement of guide 28 in directions transverse to the slide direction and is also labeled in FIG. 4 for clarity. In the illustrated embodiment, where spacer 30 is included as part of cover 26, at least a portion of the spacer 30 is interposed between the end 46 of elongated guide 28 and stop 66. The spacer 30 may be in contact or in close proximity with the end 46 of guide 28 to restrict or limit movement of the guide 28 with respect to the plate 24 in the slide direction. This is but one embodiment of retention feature 42. In another embodiment, the retention feature 42 may include only a retention wall 68 extending from side 62 of the plate 24 and including retention opening 70. In such an example, spacer 30 may extend through a separate opening in the plate 24 to limit movement of the guide 28 with respect to the plate 24 in the slide direction. As noted above, the cover 26 could be configured as a smaller component that covers only a portion of the sliding plate 24 associated with the retention feature 42. For example, cover 26 could be a piece that snaps into or is otherwise attached to the access side 64 of the retention feature 42 and that covers only the access area.

Figure 7:
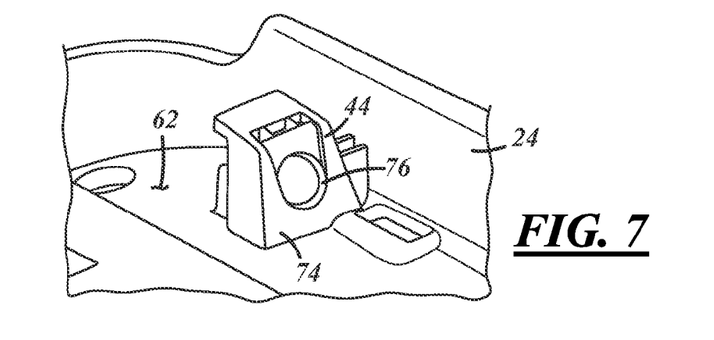
FIG. 7 is a perspective view of a guide retention feature of FIG. 4.

Referring to FIG. 6, an enlarged view of another one of the guide retention features 44 from FIGS. 3 and 4 is shown at the opposite end 48 of the elongated guide 28. In this embodiment, feature 44 is formed integrally with plate 24 in a manner similar to retention feature 42 so that it is located on side 62 of the plate 24 with access to the retention feature 44 from the opposite side 64 of the plate. Retention feature 44 may include a stop 72, a retention wall 74, and a retention opening 76 formed in the wall 74. Stop 72 and wall 74 are spaced apart from each other in the slide direction. Opening 76 performs the earlier-described function of restricting movement of guide 28 in directions transverse to the slide direction and is shown in a perspective view of feature 44 in FIG. 7 for clarity. The stop 72 may be in contact or in close proximity with the end 48 of guide 28 to restrict or limit movement of the guide 28 with respect to the plate 24 in the slide direction. This is only one embodiment of retention feature 44. In another embodiment, the retention feature 44 may include stop 72 and retention wall 74 extending from side 62 of the plate 24 in the form of tabs or ribs with retention opening 76 formed in wall 74.

Referring to FIGS. 4-6, retention features 42 and 44 of the illustrated embodiment are spaced apart along plate 24 and located at respective ends 46, 48 of the elongated guide 28. The arrangement is such that the elongated guide 28 is located between stops 66 and 72. More specifically, the guide 28 is located between stop 72 of retention feature 44 and spacer 30 in this embodiment, where the distance between stop 66 and wall 68 of retention feature 42 is greater than the distance between stop 72 and wall 74 of retention feature 44. The retention guides may be reversed as well so that the stop-to-wall spacing is greater for retention feature 44 than for retention feature 42, with spacer 30 being located at retention feature 44 instead. The greater spacing between the retention wall and the stop of one of the retention features can be useful for assembly of the slide mechanism as will be described in greater detail below.

Figures 8, 9:
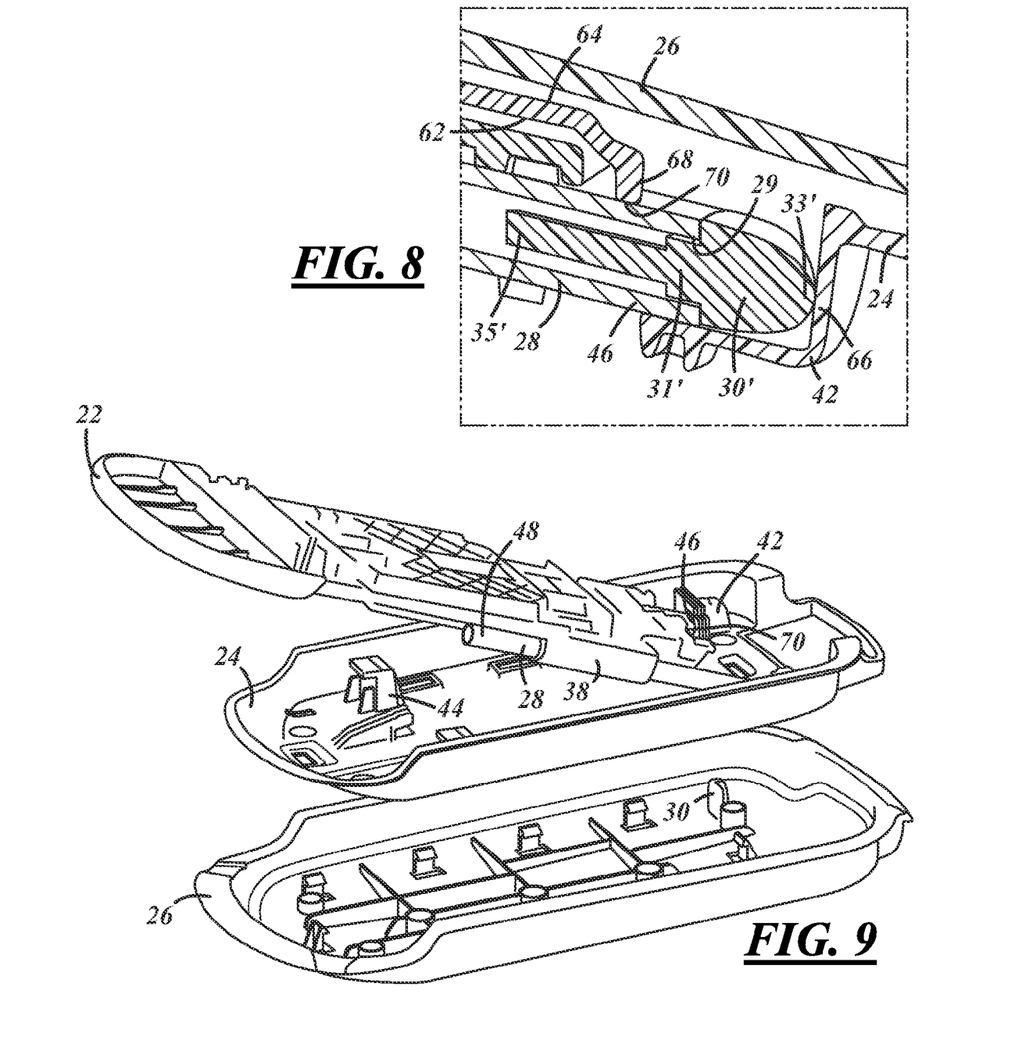
FIG. 8 is the enlarged view of the guide retention feature of FIG. 5 shown with a spacer, according to a different embodiment.
FIG. 9 is a perspective view of the slide mechanism of FIG. 2 being assembled with the elongated guides at an inclined angle, according to one embodiment.

FIG. 8 is the same view as FIG. 5 but shows a different embodiment in which spacer 30' is a separate component rather than being part of cover 26. In this embodiment, spacer 30' includes first and second ends 31' and 33'. First end 31' extends into opening 29 at the end 46 of elongated guide 28. First end 31' may be in contact with end 46 of the guide 28 and/or second end 33' may be in contact with stop 66 as shown. The particular spacer 30' depicted in FIG. 8 additionally includes extension or tail 35' that may be used to help guide end 33' into opening 29 during assembly. Where the spacer is a separate component, such as illustrated spacer 30', it may be constructed from an elastomeric material or some other material that is easily compressible so that it fits snugly between the end 46 of the guide 28 and the stop 66, thus positively locating the opposite end of the guide 28 at the retention feature stop located there. This is of course only one embodiment of a separate spacer, as spacer 30' may be constructed from any suitable material and in various shapes and sizes to help restrict or limit the movement of the guide 28 in the slide direction. For example, an elastomeric ball or block could be used as a spacer, or the spacer could be configured to extend through an opening in stop 66. The spacer could also be attached to some component other than the cover 26 as well.

Figure 10:
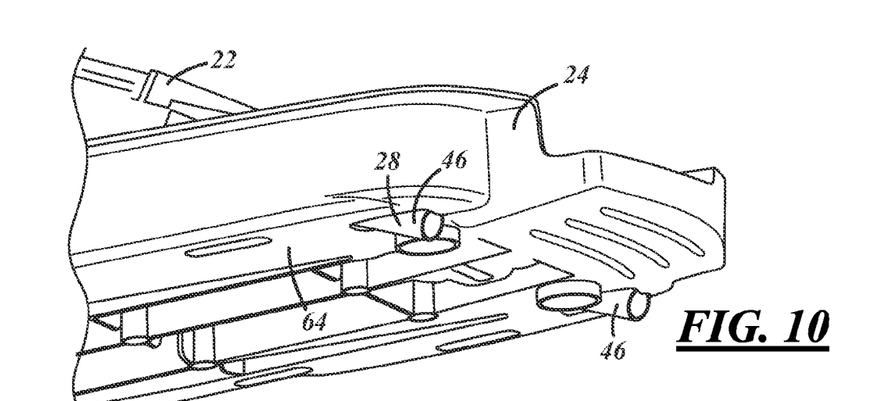
FIG. 10 is a different perspective view of the slide mechanism of FIG. 2 being assembled with the elongated guides at an inclined angle as in FIG. 9, showing one end of each of the elongated guides.

A method of making a slide mechanism for use with a vehicle armrest will now be described, with reference to FIGS. 9-12. In one embodiment, the method generally includes the steps of engaging one end of an elongated guide with a guide retention feature, engaging an opposite end of the elongated guide with another guide retention feature, and interposing a spacer between one of the guide ends and a stop of one of the guide retention features. For example, with reference to FIG. 9, ends 46 of elongated guides 28 are engaged with guide retention features 42 by inserting ends 46 through openings 70. As shown, the guides 28 may be pre-assembled with plate 22 so that the guides 28 and guide followers 38 are in sliding engagement with each other. As shown, the elongated guides 28 may have ends 46 inserted through openings 70 while at an inclined angle relative to the angle of the guides 28 in the finished assembly. FIG. 10 shows the ends 46 of the elongated guides 28 as viewed from the opposite or access side 64 of plate 24 during the illustrative method step illustrated in FIG. 9. Ends 46 of the guides 28 may contact the retention feature stop during this step as shown.

Figure 11:
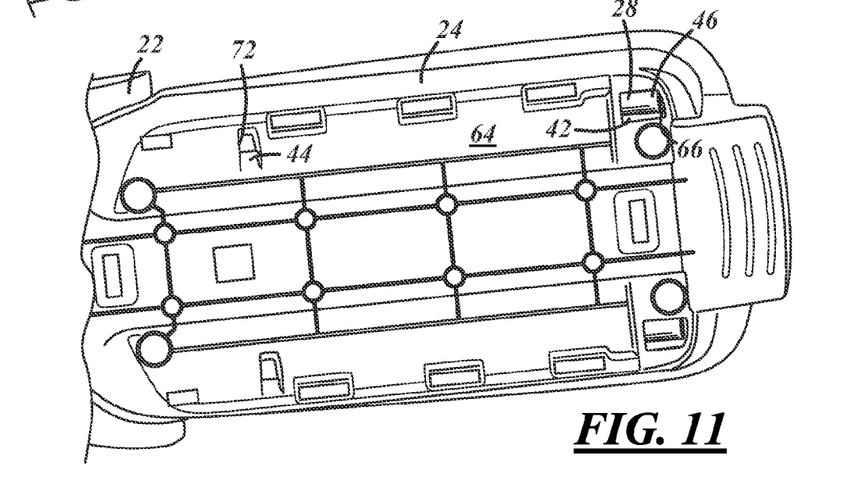
FIG. 11 is a top view of the slide mechanism of FIG. 2 with the cover omitted, showing the elongated guides in a temporary position during assembly, according to one embodiment.

In this exemplary method, the opposite ends 48 of the elongated guides 28 may then be brought into engagement with retention features 44 by reducing the inclined angle so that the ends 48 align with retention openings of the retention features 44. For example, the ends 48 of the guides may rest on an edge of the retention opening 76 shown in FIG. 7, thus orienting the elongated dimension of guides 28 in the final slide direction of the slide mechanism. At this point, the guides 28 are in a temporary position as shown in FIG. 11, where ends 46 are in contact or in close proximity with the stops of retention features 42, shown from the access side 64 in FIG. 11. In this position, there are no spacers interposed between the retention feature 42 stops and the ends 46 of the guides. Ends 46 are retained by retention features 42, as they extend through the openings 70 which restrict the movement of the ends 46 in directions transverse to the slide direction. Opposite ends 48 of the elongated guide 28 are not retained in this temporary position, however.

Figure 12:
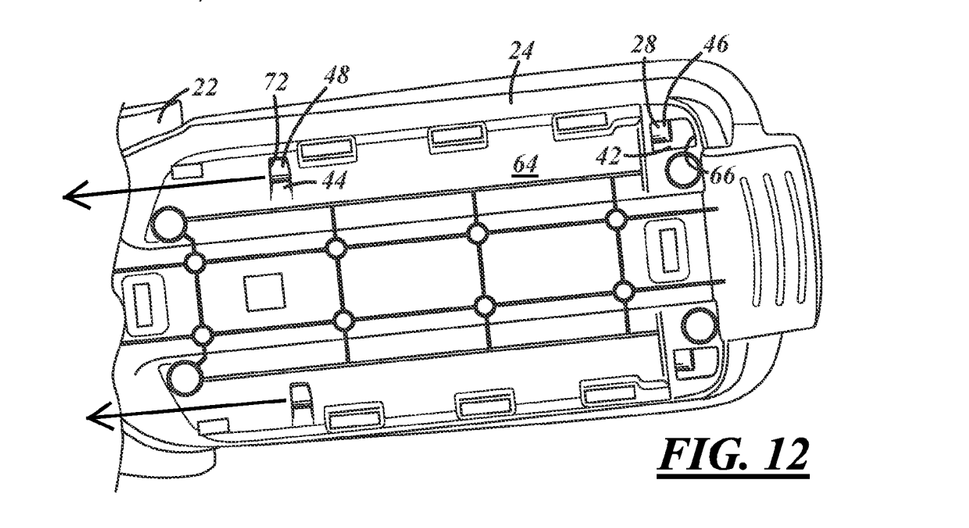
FIG. 12 is the top view of FIG. 11 showing the elongated guides in an assembled position, according to one embodiment.

Elongated guides 28 and/or plate 22 are next inserted through retention openings of retention features 44 at opposite ends 48. This step may be performed by moving the guides 28 in the slide direction and in an overall direction generally away from retention features 42 and toward retention features 44. Moving the guides 28 may include applying a force in the desired direction at ends 46, separately for each guide or together. Movement of the guides in the slide direction as indicated by the arrows in FIG. 12 may continue until ends 48 contact stop 72 of retention features 44. As shown in FIG. 12, both of the ends 46 and 48 of guides 28 are retained as each end passes through a retention opening of respective retention features 42, 44. The guides 28 are thus restricted from movement in directions transverse to the slide direction. But as configured in FIG. 12, the guide 28 is still free to move back toward stop 66 of retention feature 42. Tabs, slots, fasteners or other attachment features may be used to hold the plates 22 and 24 together in addition to the guide followers and guide retention features each being engaged with the guide 28.

Spacers are then interposed between ends 46 of the guides 28 and stops 66 of guide retention features 42 to ensure retention by restricting or limiting movement of the guides 28 in the slide direction relative to the plate 24. The spacer may be placed between ends 46 and stops 66 by insertion from the access side of the retention features 42. For example, cover 26 of FIG. 9 may be assembled to plate 24 so that spacers 30 restrict the slide direction movement of the guides 28 at least enough so that ends 48 of the guides cannot be removed or slid out of their associated retention openings. The spacers may be used to apply the above-mentioned force at ends 46 of the guides to move ends 48 through their corresponding retention openings. For example, the spacers 30 of cover 26 may be in the form of wedge-shaped elements with angled surfaces that move the guides 28 in the slide direction as the cover 26 is moved toward the plate 24 for attachment.

Thus, a slide mechanism may be constructed with a guide securely retained to one of its overlapping plates without the use of mechanical fasteners, adhesives, welds, or other separate attachment pieces or processes in a manner that does not allow the guide to snap or pop out of place, as may sometimes occur with more traditional fastener-free snap-together features. Of course, these additional types of retention may be optionally included, but their necessity may be greatly reduced according to the teachings presented herein.

It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

The invention claimed is:

1. A slide mechanism for use with a vehicle armrest, comprising:
    a guide retention plate having guide retention features;
    a guide follower plate having a guide follower and being in an overlapping arrangement with the guide retention plate;
    an elongated guide in sliding engagement with the guide follower and having opposite ends aligned along a slide direction, each one of the opposite ends being retained by a different one of the guide retention features such that movement of the elongated guide in all directions transverse to the slide direction is restricted by the guide retention features, wherein one of the guide retention features includes a stop located at one end of the elongated guide; and
    a spacer located at the opposite end of the elongated guide so that the elongated guide lies between the stop and the spacer, wherein the spacer limits the amount of movement of the elongated guide with respect to the guide retention plate in the slide direction and away from the stop so that retention of said one end of the elongated guide is maintained by its corresponding guide retention feature.

2. A slide mechanism as defined in claim 1, wherein the guide retention feature that retains said opposite end of the elongated guide further comprises a corresponding stop, and the spacer is located between said corresponding stop and said opposite end of the elongated guide.

3. A slide mechanism as defined in claim 2, wherein the spacer is a separate piece in contact with at least one of said opposite end of the elongated guide or said corresponding stop.

4. A slide mechanism as defined in claim 3, wherein one end of the spacer extends into an opening formed at said opposite end of the elongated guide.

5. A slide mechanism as defined in claim 1, further comprising a cover attached to the guide retention plate, wherein the spacer extends from the cover.

6. A slide mechanism as defined in claim 1, wherein the guide retention plate is a sliding plate and the guide follower plate is a stationary plate so that the elongated guide moves with the sliding plate when the plates move relative to each other in the slide direction.

7. A slide mechanism as defined in claim 1, wherein the guide retention plate is a stationary plate and the guide follower plate is a sliding plate so that the guide follower moves with the sliding plate when the plates move relative to each other in the slide direction.

8. A slide mechanism as defined in claim 1, further comprising:
    a pair of elongated guides arranged parallel with the slide direction and in sliding engagement with a corresponding pair of guide followers of the guide follower plate, each of the elongated guides having opposite ends and each end being retained by a different one of the guide retention features such that movement of the elongated guides in all directions transverse to the slide direction is restricted by the guide retention features, wherein each of the guide retention features includes a stop located so that each elongated guide lies between a corresponding pair of stops; and
    a spacer interposed between one of the ends of each elongated guide and the corresponding retention feature stop so that movement of each of the elongated guides in the slide direction is restricted to maintain the retention of both ends of each elongated guide by the respective guide retention features.

9. A vehicle console assembly, comprising:
    a console base; and
    an armrest attached to the console base, wherein the armrest comprises the slide mechanism as defined in claim 1 and a decorative covering disposed over the slide mechanism.

10. A method of making a slide mechanism for use with a vehicle armrest, the method comprising the steps of:
    (a) engaging one end of an elongated guide with a guide retention feature of a guide retention plate, the elongated guide being in sliding engagement with a guide follower of a guide follower plate;
    (b) engaging an opposite end of the elongated guide with another guide retention feature of the guide retention plate; and
    (c) interposing a spacer between the one end of the guide and a stop of the guide retention feature of step (a) to ensure retention of both ends of the elongated guide by the guide retention features.

11. A method of making a slide mechanism for use with a vehicle armrest, the method comprising the steps of:
    (a) engaging one end of an elongated guide with a guide retention feature of a guide retention plate, the elongated guide being in sliding engagement with a guide follower of a guide follower plate;
    (b) engaging an opposite end of the elongated guide with another guide retention feature of the guide retention plate; and
    (c) interposing a spacer between the one end of the guide and a stop of the guide retention feature of step (a) to ensure retention of both ends of the elongated guide by the guide retention features;
    wherein the method further comprises the steps of:
    (i) passing said one end of the elongated guide through a retention opening formed in the guide retention feature of step (a); and
    (ii) subsequently passing said opposite end of the elongated guide through a retention opening formed in the guide retention feature of step (b) while simultaneously increasing the amount of space between said stop and said one end of the elongated guide.

12. The method of claim 11, wherein step (c) comprises the steps of:
    providing a cover having a projection extending from the cover; and
    attaching the cover to the guide retention plate so that the projection is the interposed spacer.

13. The method of claim 11, wherein step (c) comprises the steps of:
    inserting one end of the spacer into an opening at the one end of the elongated guide; and
    placing an opposite end of the spacer in contact with said stop.

14. The method of claim 11, wherein the elongated guide is at an inclined angle during step (i) relative to the angle of the elongated guide during step (ii).

15. A slide mechanism for use with a vehicle armrest, comprising:
- a guide retention plate having guide retention features;
- a guide follower plate having a guide follower and being in an overlapping arrangement with the guide retention plate;
- an elongated guide in sliding engagement with the guide follower and having opposite ends aligned along a slide direction, each one of the opposite ends being retained by a different one of the guide retention features such that movement of the elongated guide in all directions transverse to the slide direction is restricted by the guide retention features, wherein one of the guide retention features includes a stop located at one end of the elongated guide; and
- a spacer located at the opposite end of the elongated guide so that the elongated guide lies between the stop and the spacer, wherein the spacer limits the amount of movement of the elongated guide in the slide direction and away from the stop so that retention of said one end of the elongated guide is maintained by its corresponding guide retention feature;
- wherein each of the retention features further comprises a retention wall, each retention wall having an opening that substantially surrounds the elongated guide to restrict movement of the elongated guide in all directions transverse to the slide direction.

16. A slide mechanism as defined in claim 15, wherein the guide retention feature that retains said opposite end of the elongated guide further comprises a corresponding stop, the spacer is located between said corresponding stop and said opposite end of the elongated guide, and the spacer is a separate piece in contact with at least one of said opposite end of the elongated guide or said corresponding stop.

17. A slide mechanism as defined in claim 15, further comprising a cover attached to the guide retention plate, wherein the spacer extends from the cover.

18. A slide mechanism as defined in claim 15, wherein the guide retention plate is a sliding plate and the guide follower plate is a stationary plate so that the elongated guide moves with the sliding plate when the plates move relative to each other in the slide direction.

19. A slide mechanism as defined in claim 15, wherein the guide retention plate is a stationary plate and the guide follower plate is a sliding plate so that the guide follower moves with the sliding plate when the plates move relative to each other in the slide direction.

20. A vehicle console assembly, comprising:
a console base; and
an armrest attached to the console base, wherein the armrest comprises the slide mechanism as defined in claim 15 and a decorative covering disposed over the slide mechanism.

* * * * *